United States Patent
Sunell et al.

(10) Patent No.: US 9,775,080 B2
(45) Date of Patent: Sep. 26, 2017

(54) FIRST NETWORK NODE, A SECOND NETWORK NODE AND METHODS THEREIN FOR HANDOVER PREPARATION

(71) Applicant: Telefonaktiebolaget L M Ericsson (publ), Stockholm (SE)

(72) Inventors: Kai-Erik Sunell, Bromma (SE); Ingrid Nordstrand, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 197 days.

(21) Appl. No.: 14/401,207

(22) PCT Filed: Oct. 31, 2014

(86) PCT No.: PCT/SE2014/051289
§ 371 (c)(1),
(2) Date: Nov. 14, 2014

(87) PCT Pub. No.: WO2015/142240
PCT Pub. Date: Sep. 24, 2015

(65) Prior Publication Data
US 2016/0277981 A1    Sep. 22, 2016

Related U.S. Application Data

(60) Provisional application No. 61/955,832, filed on Mar. 20, 2014.

(51) Int. Cl.
*H04W 36/00* (2009.01)
*H04W 4/00* (2009.01)
(Continued)

(52) U.S. Cl.
CPC ....... *H04W 36/0083* (2013.01); *H04W 4/005* (2013.01); *H04W 8/22* (2013.01); *H04W 36/005* (2013.01); *H04W 76/027* (2013.01)

(58) Field of Classification Search
CPC ... H04W 36/0083; H04W 4/005; H04W 8/22; H04W 76/027
(Continued)

(56) References Cited

U.S. PATENT DOCUMENTS 6,614,769 B1 * 9/2003 Erlick ................ H04W 36/30
370/331
6,650,899 B1 * 11/2003 Stumpert .......... H04W 36/0055
455/436

(Continued)

FOREIGN PATENT DOCUMENTS

EP    2385725 A1    11/2011
WO   0044189 A1    7/2000

OTHER PUBLICATIONS

Unknown, Author, "Handover target selection for category, Change Request", Huawei, 3GPP TSG-RAN3 Meeting #85, R3-141634, Dresden, Germany, Aug. 18-22, 2014, 1-32.

(Continued)

*Primary Examiner* — Marceau Milord
(74) *Attorney, Agent, or Firm* — Murphy, Bilak & Homiller, PLLC

(57) ABSTRACT

A method in a first network node for handover preparation of a user equipment of a first category in a wireless communications network. The handover preparation is performed between a first cell served by the first network node and a second cell served by a second network node comprised in the wireless communications network. The first network node sends (301) to the second network node a message comprising information indicating a request for preparation of a handover of the user equipment. The request is specific for user equipment of the first category.

The first network node receives (302) from the second network node a message indicating failure to prepare the handover.

(Continued)

The first network node interprets (303) the message indicating failure to prepare the handover as an indication that the second network node does not support any user equipment of the first category.

22 Claims, 7 Drawing Sheets

(51) Int. Cl.
*H04W 8/22* (2009.01)
*H04W 76/02* (2009.01)

(58) Field of Classification Search
USPC ............... 455/443, 436, 442, 437, 433, 439
See application file for complete search history.

(56) References Cited

U.S. PATENT DOCUMENTS

| | | | | |
|---|---|---|---|---|
| 6,650,905 | B1* | 11/2003 | Toskala | H04W 52/40 |
| | | | | 455/436 |
| 7,072,652 | B2* | 7/2006 | Stephens | H04W 36/26 |
| | | | | 455/424 |
| 8,929,894 | B2* | 1/2015 | Catovic | H04W 36/30 |
| | | | | 370/216 |
| 2005/0130658 | A1 | 6/2005 | Stephens | |
| 2006/0176872 | A1* | 8/2006 | Serna | H04W 8/24 |
| | | | | 370/351 |
| 2013/0115949 | A1* | 5/2013 | Centonza | H04W 36/245 |
| | | | | 455/436 |
| 2014/0051445 | A1* | 2/2014 | Vikberg | H04W 36/02 |
| | | | | 455/436 |
| 2014/0056243 | A1* | 2/2014 | Pelletier | H04W 74/04 |
| | | | | 370/329 |
| 2014/0211762 | A1* | 7/2014 | Bontu | H04W 36/30 |
| | | | | 370/332 |
| 2014/0301360 | A1* | 10/2014 | Bontu | H04W 36/0083 |
| | | | | 370/331 |
| 2015/0009802 | A1* | 1/2015 | Wager | H04W 76/027 |
| | | | | 370/218 |
| 2015/0131544 | A1* | 5/2015 | Behravan | H04L 5/0048 |
| | | | | 370/329 |
| 2015/0249950 | A1* | 9/2015 | Teyeb | H04W 36/0016 |
| | | | | 455/437 |
| 2015/0350979 | A1* | 12/2015 | Larsson | H04L 25/0224 |
| | | | | 370/252 |
| 2016/0037406 | A1* | 2/2016 | Centonza | H04W 36/04 |
| | | | | 370/332 |
| 2016/0066330 | A1* | 3/2016 | Centonza | H04W 72/044 |
| | | | | 370/329 |
| 2016/0142969 | A1* | 5/2016 | Hedman | H04W 36/0022 |
| | | | | 370/331 |
| 2016/0277981 | A1* | 9/2016 | Sunell | H04W 36/005 |

OTHER PUBLICATIONS

Unknown, Author, "Size of E-UTRAN UE Capabilities", Ericsson, TSG-RAN WG2 Meeting #64bis, R2-090218, Ljubljana, Slovenia, Jan. 12-16, 2009, 1-12.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, 1-344.

3GPP, "3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.1.0, Mar. 2014, 1-143.

Unknown, Author, "Handling of low complexity UE categories during handover", 3GPP TSG-RAN WG2 #86, Tdoc R2-142120, Seoul, South Korea, May 19-23, 2014, 1-4.

Unknown, Author, "Handover for low cost MTC feature", 3GPP TSG-RAN WG2 #85bis, Tdoc R2-141311, Valencia, Spain, Mar. 31-Apr. 4, 2014, 1-2.

Unknown, Author, "Handover for low cost MTC feature—Change Request", 3GPP TSG-RAN WG2 Meeting #85bis, R2-141312, Valencia, Spain, Mar. 31-Apr. 4, 2014, 1-4.

Unknown, Author, "Introduction of Category 0 for low cost MTC Change Request", 3GPP TSG-RAN WG2 #85, R2-140964, Change Request 36.306, CR-0172, V11.5.0, Huawei, HiSilicon, Prague, Czech Republic, Feb. 10-14, 2014, 1-3.

Unknown, Author, "Introduction of category handling for low complexity UEs (option 2)—Change Request", 3GPP TSG-RAN WG2 Meeting #86, R2-142122, Seoul, South Korea, May 19-23, 2014, 1-4.

* cited by examiner

FIRST NETWORK NODE, A SECOND NETWORK NODE AND METHODS THEREIN FOR HANDOVER PREPARATION

TECHNICAL FIELD

Embodiments herein relate to a first network node, a second network node and methods therein for handover preparation. In particular they relate to handover preparation of machine type communication equipment.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Examples of wireless communication systems are Long Term Evolution (LTE), Universal Mobile Telecommunications System (UMTS) and Global System for Mobile communications (GSM).

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

One important function of 3GPP cellular radio technologies is the control of user mobility by using the Radio Resource Control (RRC) and X2AP protocols. The network controls the handover of UEs in RRC Connected mode from one cell to another whereas a UE in idle mode performs cell selection and reselection itself.

3GPP has recently agreed within the scope of low-cost Machine Type Communication (MTC) work item to introduce a new UE category termed as category 0. The UE category defines a combined set of UE capabilities. A draft Change Request (CR) for the introduction of category 0 is available in R2-140964 as presented during RAN2#85 meeting in Prague, 10.02.2014 to 14.02.2014, Prague, Czech Republic.

The UEs of this new category are less capable than e.g. UEs of legacy category 1, which currently is the least capable legacy category. Legacy category UEs are UEs that implements an older version of the RRC protocol than the new category UE, such as category 0 UE, does. Upon handover of a category 0 UE to a legacy target eNB, i.e an eNB that implements an older version of the RRC protocol than the new category UE, e.g. category 0 UE, does, the handover preparation will be successful, while the subsequent handover will fail because the legacy eNB and the new category UE, e.g. the category 0 UE, are only partly compatible when it comes to the RRC protocol. Following the handover failure the category 0 UE will experience a radio link failure. Subsequently, the category 0 UE will try to trigger RRC Connection Re-establishment which also will fail for the same reason of non-compatibility. Finally, the category 0 UE will transition to idle mode where it will search for suitable cells. The failed handover and the unsuccessful RRC Connection Re-establishment will result in unnecessary signalling in the network and in shorter battery lifetime for the UE. Connection drops may also result.

SUMMARY

It is therefore an object of embodiments herein to provide an improved way of handover preparation of user equipments.

According to a first aspect of embodiments herein, the object is achieved by a method in a first network node for handover preparation of a user equipment of a first category in a wireless communications network. The handover preparation is performed between a first cell served by the first network node and a second cell served by a second network node. The first network node, the second network node, the first cell and the second cell are comprised in the wireless communications network.

The first network node sends to the second network node a message comprising information indicating a request for preparation of a handover of the user equipment. The request is specific for user equipment of the first category.

The first network node receives from the second network node a message indicating failure to prepare the handover.

The first network node interprets the message indicating failure to prepare the handover as an indication that the second network node does not support any user equipment of the first category.

According to a second aspect of embodiments herein, the object is achieved by a first network node for handover preparation of a user equipment of a first category in a wireless communications network. The wireless communications network is configured to comprise the first network node configured to serve a first cell. The wireless communications network is further configured to comprise a second network node configured to serve a second cell. The handover preparation is to be performed between the first cell and the second cell.

The first network node is configured to send to the second network node a message comprising information indicating a request for preparation of a handover of the user equipment, which request is specific for user equipment of the first category.

The first network node is further configured to receive from the second network node a message indicating failure to prepare the handover.

The first network node is further configured to interpret the message indicating failure to prepare the handover as an indication that the second network node does not support any user equipment of the first category.

According to a third aspect of embodiments herein, the object is achieved by a method in a second network node for handover preparation of a user equipment of a first category in a wireless communications network. The handover preparation is performed between a first cell served by a first network node and a second cell served by the second network node. The first network node, the second network node, the first cell and the second cell are comprised in the wireless communications network.

The second network node receives from the first network node a message comprising information indicating a request for preparation of a handover of the user equipment, which request is specific for user equipment of the first category.

The second network node further sends to the first network node a message indicating failure to prepare the handover based on the received information indicating the request for preparation of the handover. The failure to prepare the handover indicates to the first network node that the second network node does not support any user equipment of the first category.

According to a fourth aspect of embodiments herein, the object is achieved by a second network node for handover preparation of a user equipment of a first category in a wireless communications network. The wireless communications network is configured to comprise a first network node configured to serve a first cell. The wireless communications network is further configured to comprise the second network node configured to serve the second cell. The handover preparation is to be performed between the first cell and the second cell.

The second network node is configured to receive from the first network node a message comprising information indicating a request for preparation of a handover of the user equipment. The request is specific for user equipment of the first category.

The second network node is further configured to send to the first network node a message indicating failure to prepare the handover based on the received information indicating the request for preparation of the handover. The failure to prepare the handover indicates to the first network node that the second network node does not support any user equipment of the first category.

The first network node sends to the second network node the request for preparation of the handover, which request is specific for user equipment of the first category.

Since the first network node interprets the message indicating failure to prepare the handover as an indication that the second network node does not support any user equipment of the first category, the first network node avoids handover failure of user equipment of the first category.

An advantage with embodiments herein is that embodiments herein enable unnecessary signalling, caused by failed handovers and unsuccessful RRC connection re-establishments, to be avoided. Consequently, network resources are used in a more efficient manner and UE battery lifetime is prolonged.

A further advantage is that connection drops are avoided.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed.

When a UE is handed over from a source cell to a target cell, handover preparation is needed. Upon handover preparation the target radio base station or eNB is provided a current UE RRC configuration comprised in a handover preparation information message. The target eNB decides an RRC configuration after the handover and therefore an RRC configuration message is transparently sent to the UE via the source eNB as an octet string comprised in a handover command.

If the RRC configuration in the handover preparation message is incomplete, or the source cell has configured the UE with an RRC protocol version that is comprehended by the target eNB, the target eNB typically performs a full configuration if possible, i.e. the target eNB performs a reconfiguration from scratch. Otherwise the target eNB may modify or maintain the current UE RRC configuration.

Upon handover of a category 0 UE to a legacy target eNB the legacy target eNB may erroneously assume that the category 0 UE may be successfully configured as e.g. the least capable legacy category, such as category 1. Consequently, the handover fails and the category 0 UE experiences a radio link failure.

Embodiments herein address the issue of handover failure due to network nodes that do not support specific user equipment types or specific categories of user equipment. Specifically, embodiments herein address handover failure due to base stations that do not support MTC user equipment, such as category 0 UEs.

Embodiments herein introduce a new branch of the handover preparation information message in a new version of the RRC protocol. The new branch is intended to be used for handover preparation of UEs of specific categories, such as category 0 UEs, which are not compatible with old categories when it comes to the RRC protocol. The handover preparation is rejected by legacy eNBs because they do not implement the new branch. More specifically for LTE, if the RRC container, which is an information element within the Handover Request message, and contains the Handover-PreparationInformation, is not possible to be decoded by the target eNB, then the target eNB will reject the Handover Request.

Upon failed handover preparation, the source eNB does not trigger any handover procedure. Instead the source eNB interprets a handover failure as an indication that the target eNB does not support UEs of the specific category, such as category 0 UEs.

Following the failure of handover preparations the source eNB may either try to handover the UE of the specific category, such as the category 0 UE, to another eNB or to another frequency, or release the RRC connection.

Figure 1:
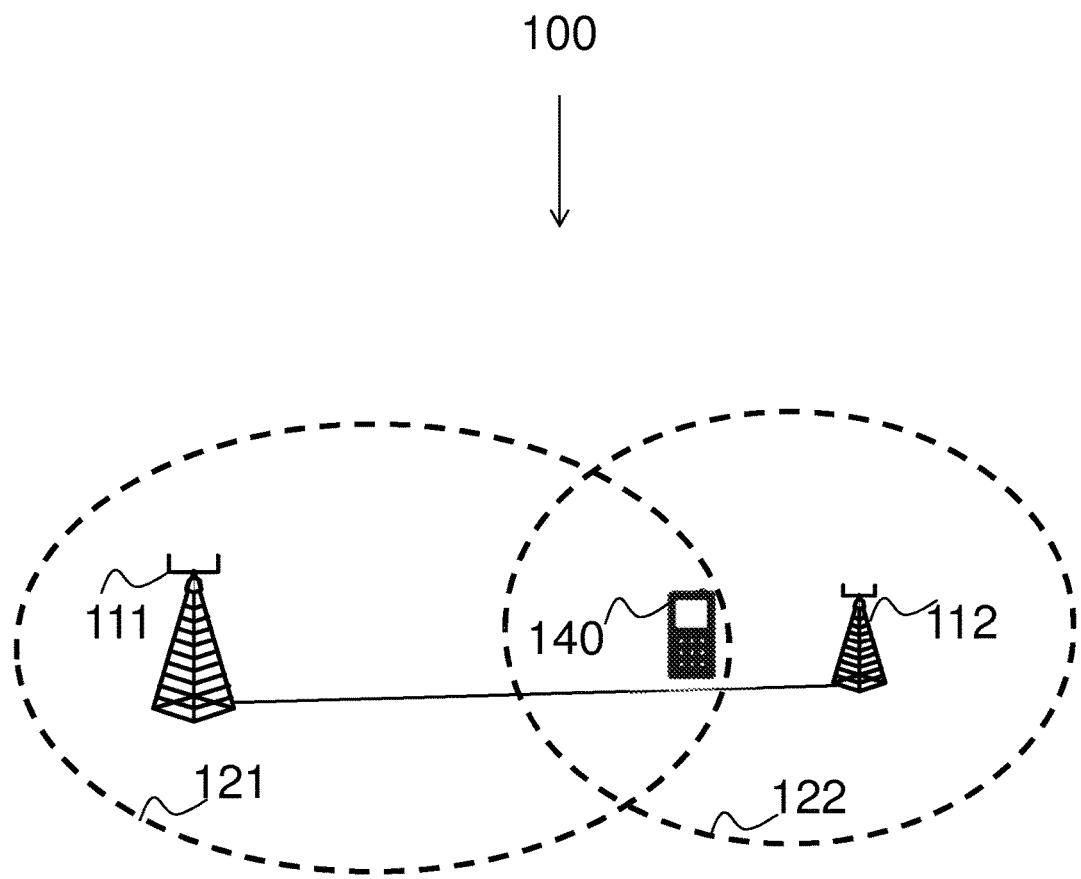
FIG. 1 is a schematic block diagram illustrating embodiments of a wireless communications network.

FIG. 1 depicts parts of one or more wireless communications networks 100 in which embodiments herein may be implemented. The one or more wireless communications networks 100 may for example be LTE, UMTS, GSM, any 3GPP wireless communications network, or any cellular wireless communications network or system capable of handling UEs of more than one category or of different capabilities.

Embodiments herein are illustrated with examples from an Evolved Universal Terrestrial Radio Access (EUTRA) network also known as LTE network.

The wireless communications network 100 comprises a plurality of base stations and/or other network nodes. More specifically, the wireless communications network 100 comprises a first network node 111. The first network node 111 is also referred to herein as a source network node. The wireless communications network 100 further comprises a second network node 112. The second network node 112 is also referred to herein as a candidate or target network node.

The term "network node" may correspond to any type of radio network node or any network node, which communicates with at least a radio network node. For example, the first and second network nodes 111, 112 may each be a base station, such as an eNB. The base station may also be referred to as a NodeB, an evolved Node B (eNB, eNode B), a base transceiver station (BTS), Access Point Base Station, base station router, or any other network unit capable of communicating with a user equipment within a cell served by the base station depending e.g. on the radio access technology and terminology used.

In some embodiments the first network node 111 and the second network node 112 belong to two different wireless communications networks. For example, the first network node 111 may belong to an UMTS network and the second network node 112 may belong to an LTE network. The first network node 111 may then be a Radio Network Controller (RNC) in the UMTS network.

The first network node 111 serves a first cell 121, also referred to as a source cell, the second network node 112 serves a second cell 122, also referred to as a candidate cell or target cell.

A cell is a geographical area where radio coverage is provided by network node equipment such as Wi-Fi AP equipment, base station equipment at a base station site or at remote locations in Remote Radio Units (RRU). The first network node is an example of such network node equipment. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying cells uniquely in the whole of a wireless communication network is also broadcasted in the cells.

Network nodes, such as base stations and Wi-Fi AP, communicate over the air or radio interface operating on radio frequencies with the user equipments within range of the network nodes. The user equipment transmit data over the radio interface to network nodes, such base stations and Wi-Fi AP, in UL transmissions, and network nodes, such as Wi-Fi AP and base stations, transmit data over an air or radio interface to the user equipment in DL transmissions.

The first network node 111 communicates with user equipments in the first cell 121, such as a user equipment 140, also referred to as a UE or a wireless device. The user equipment 140 is to be handed over to a cell different from the first cell 121. The handover may for example be due to mobility of the user equipment 140. The user equipment 140 is of a first category. The first category may be category 0. The user equipment 140 may be an MTC user equipment. The second network node 112 does not support this first category.

The user equipment 140 may e.g. be a mobile terminal or a wireless terminal, a mobile phone, a computer such as e.g. a laptop, a Personal Digital Assistants (PDAs) or a tablet computer, sometimes referred to as a surf plate, with wireless capability, target device, device to device UE, MTC UE or UE capable of machine to machine communication, iPad, mobile terminals, smart phone, Laptop Embedded Equipment (LEE), Laptop Mounted Equipment (LME), USB dongles etc. or any other radio network units capable to communicate over a radio link in a wireless communications network. Please note the term user equipment used in this document also covers other wireless devices such as Machine to machine (M2M) devices, even though they do not have any user.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 2:
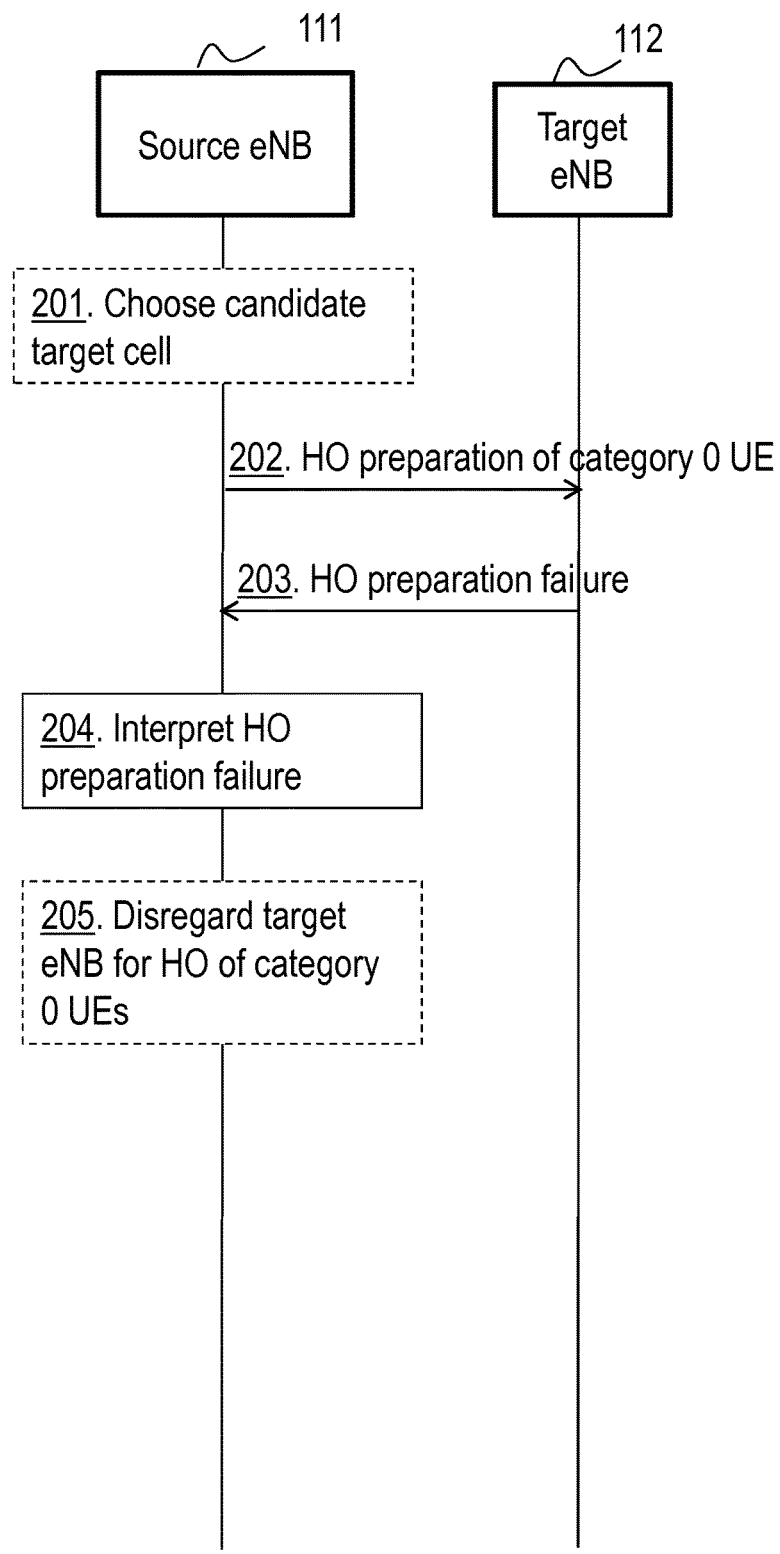
FIG. 2 is a combined signalling diagram and flowchart illustrating embodiments of a method in a wireless communications network.

FIG. 2 is a combined signalling diagram and flow chart that describes actions that may take place to prepare handover of the user equipment 140 of the first category, such as a UE of category 0, between the first cell 121 served by the first network node 111 and the second cell 122 served by the second network node 112 according to embodiments herein.

Action 201

In this action the first network node 111 chooses a candidate target cell for handover of the user equipment 140. The handover may for example be triggered by mobility.

Action 202

The first network node 111 sends a message to the second network node 112. The message comprises information on handover preparation for the user equipment 140. The information indicates a request for preparation of handover of the user equipment 140. The request is specific for user equipment of the first category.

The second network node 112 is a legacy eNB that does not support communication with user equipment of the first category, such as category 0 UEs. According to embodiments herein, the second network node 112, e.g. target eNB, will not erroneously assume that the user equipment 140 of the first category may be successfully configured as e.g. the least capable legacy category, such as category 1, since the request is specific for user equipment of the first category.

The message may, for example, comprise a Handover Preparation Information message specific for user equipment of the first category. The Handover Preparation Information message may comprise information on the capability of the user equipment 140 of the first category.

The Handover Preparation Information message may be extended from previous versions of the message, such as the LTE Release-8 version of the Handover Preparation Information message. The extended message may be termed an LTE Release-12 branch of the Handover Preparation Information message. The extension may have exactly the same information content as a legacy Release-8 branch of the Handover Preparation Information message.

The message comprising handover preparation information may be used to transfer RRC information, which is to be used by the target eNB, which in this case is the second network node 112, during handover preparation, including UE capability information. If the UE is of category 0, the handover preparation may be performed by using the HandoverPreparationInformation Release-12 version of the message comprising handover preparation information, such as the HandoverPreparationINformation message in LTE.

The handover preparation will be rejected by legacy eNBs, such as the second network node 112, because they have not implemented the new branch of the Handover Preparation Information message. More specifically for LTE, if the RRC container, containing the HandoverPreparationInformation within the Handover Request message, is not possible to be decoded by the target eNB, then the target eNB will reject the Handover Request.

Action 203

When the first network node 111, e.g. source eNB, encodes the handover preparation information with a new version of a signalling syntax, only those target eNBs that implement the new version of the signalling syntax are able to comprehend the message, since it is critically extended, i.e. it is mandatory to comprehend the extension in order to not produce a failure. Upon the reception of this new branch of the handover preparation information message, legacy eNBs will decode only NULL because they do not implement the new branch.

Accordingly, the second network node 112, e.g. target eNB, will reject the handover preparation information message because the X2AP protocol, specified in 3GPP TS 36.423 sub clause 9.1.1.1, defines criticality for the RRC Context in the handover request message that is comprised in the handover preparation.

In other words, when the second network node 112 has received the message comprising information on the handover preparation for the user equipment 140 of the first category, the second network node 112 sends to the first network node 111 a message indicating failure to prepare the handover based on the received information indicating the request for preparation of the handover for user equipment of the first category.

In LTE the target eNB, such as the second network node 112, rejects the handover preparation since the X2AP protocol, specified in 3GPP TS 36.423 sub clause 8.2.1.3, specifies that if the target eNB receives a HANDOVER REQUEST message containing RRC Context IE that does not include the required information, i.e. the HandoverPreparationInformation as specified in 3GPP TS 36.331, the target eNB shall send the HANDOVER PREPARATION FAILURE message to the source eNB, such as the first network node 111.

Action 204

The first network node 111 receives the message indicating failure to prepare the handover and interprets the message indicating failure to prepare the handover as an indication that the second network node 112 does not support any user equipment of the first category.

Action 205

Once the first network node 111, e.g. source eNB, has received the message indicating failure of handover preparation as a response to the request for preparation of the handover it may infer that the second network node 112, e.g. target eNB, does not support user equipment of the first category, such as category 0 UEs. Accordingly, the first network node 111, e.g. source eNB, may try to handover the user equipment 140 to another eNB or release the user equipment 140 to idle mode. In idle mode the user equipment 140 may search for a suitable cell itself.

In other words, the first network node 111 may disregard the second network node 112 as a potential candidate for handover of any user equipment of the first category.

Figure 3:
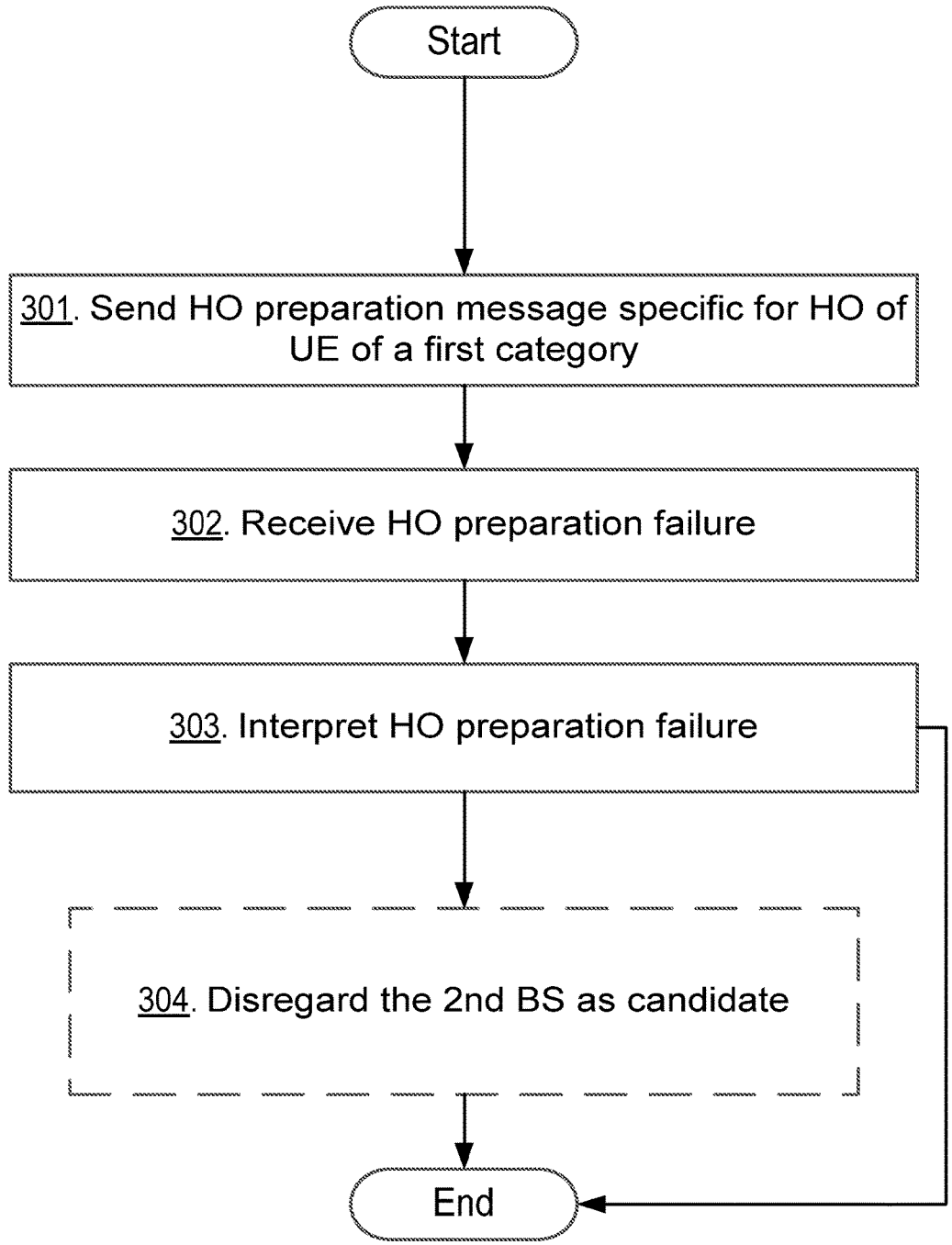
FIG. 3 is a flowchart illustrating embodiments of a method in a first network node.

Embodiments of a method in the first network node 111 for handover preparation of the user equipment 140 of the first category in the wireless communications network 100 will now be described with reference to a flowchart depicted in FIG. 3.

The handover preparation is performed between the first cell 121, also referred to as the source cell, served by the first network node 111, and the second cell 122, also referred to as the candidate cell or target cell, served by the second network node 112.

As mentioned above, the user equipment 140 is of the first category, which first category may indicate that the user equipment 140 has capability for MTC.

The first category may comprise category 0. In some embodiments the user equipment 140 is of the MTC type. In some embodiments the first category has limited capabilities compared to the least capable legacy category, such as category 1.

The method comprises the following actions, which actions may be taken in any suitable order.

Action 301

The first network node 111 sends a message to the second network node 112. The message comprises information on handover preparation for the user equipment 140. The information indicates the request for preparation of handover for the user equipment 140. The request is specific for user equipment of the first category.

Since the request is specific for user equipment of the first category, the second network node 112 will not erroneously assume that the user equipment 140 of the first category may be successfully configured as a user equipment of another category.

The message may, for example, comprise the Handover Preparation Information message specific for user equipment of the first category.

The Handover Preparation Information message specific for user equipment of the first category may comprise information on the capability of the user equipment 140 of the first category.

A sending module 510 in the first network node 111 may be configured to perform action 301.

Action 302

The first network node 111 receives the message indicating failure to prepare the handover from the second network node 112.

A receiving module 520 in the first network node 111 may be configured to perform action 302.

Action 303

The first network node 111 then interprets the message indicating failure to prepare the handover as an indication that the second network node 112 does not support any user equipment of the first category.

An interpreting module 530 in the first network node 111 may be configured to perform action 301.

Action 304

The first network node 111 may disregard the second network node 112 as a potential candidate for handover of any user equipment of the first category.

In other words, the first network node 111 selects a potential candidate base station for handover of any user equipment of the first category, and specifically for the user equipment 140 for which the handover preparation message was sent, based on the action of interpreting the received message indicating failure to prepare the handover.

A disregarding module 540 in the first network node 111 may be configured to perform action 304.

Some other embodiments of the method described above in the first network node 111, will now be described with reference to a flowchart in FIG. 4.

Action 401

The first network node 111 makes a list of possible target eNBs for handover.

Action 402

The first network node 111 evaluates whether the list is empty. If the list is empty the first network node 111 proceeds to action 407.

Action 403

If the list is non-empty the first network node 111 chooses one candidate eNB and sends handover preparation information to the candidate eNB by using the handover preparation message specific for user equipment of the first category, e.g. the Release-12 version of the handover preparation message.

Action 404

The first network node 111 receives a response from the second network node 112, e.g. the target eNB, to the handover preparation message.

Action 405

If the second network node 112, i.e. the target eNB, responds with a handover preparation failure, the first network node 111 interprets the handover preparation failure as the second network node 112, e.g. the target eNB, does not support user equipments of the first category, such as category 0 UEs.

Action 406

The first network node 111 removes the second network node 112 from the list of possible target eNBs for handover of user equipment of the first category, and returns to action 402.

Action 407

If the list is empty the first network node 111 releases the RRC connection to the user equipment 140 and thereby transitions the user equipment 140 to idle mode.

Figure 4:
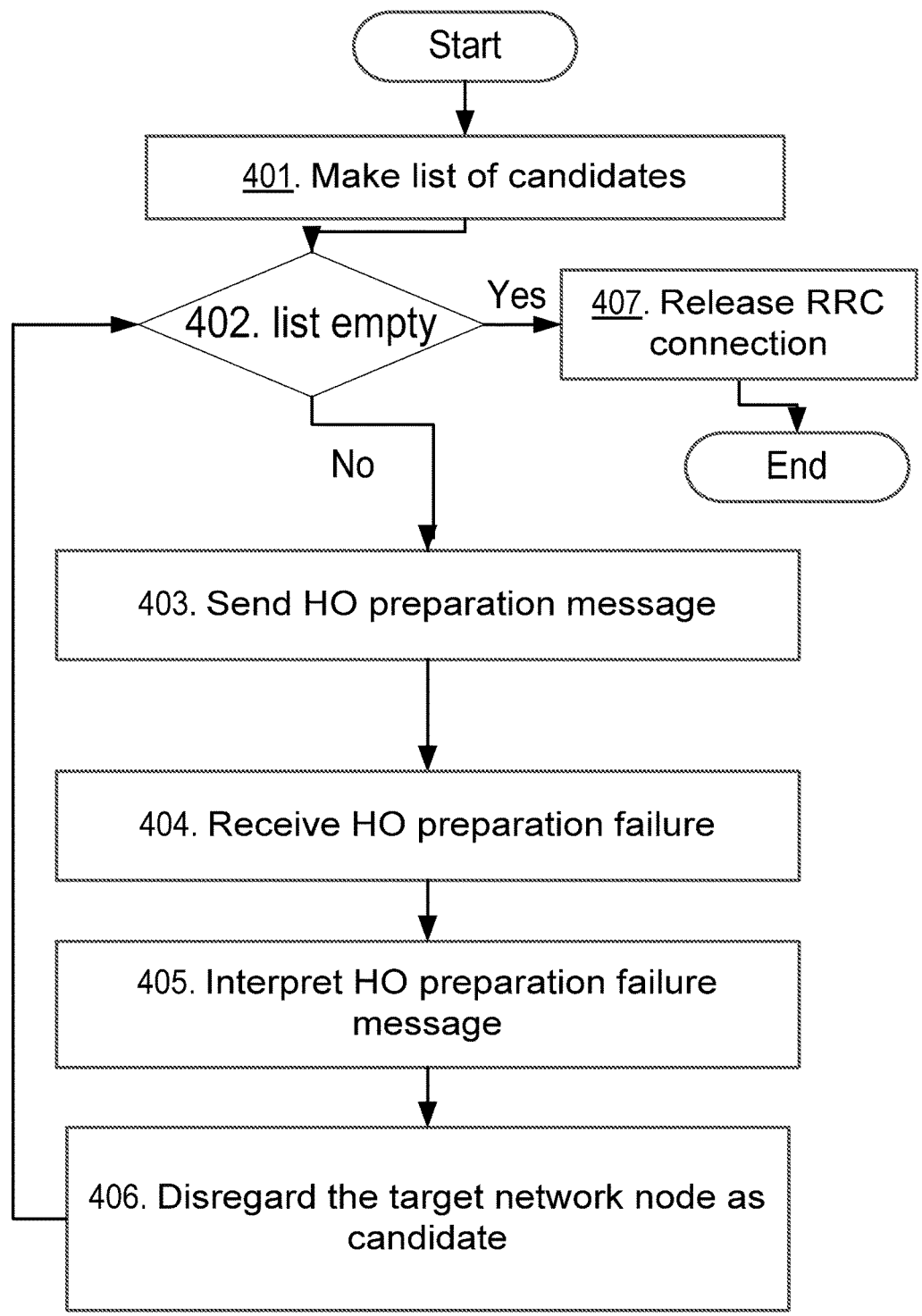
FIG. 4 is a flowchart illustrating further embodiments of a method in a first network node.
Figure 5:
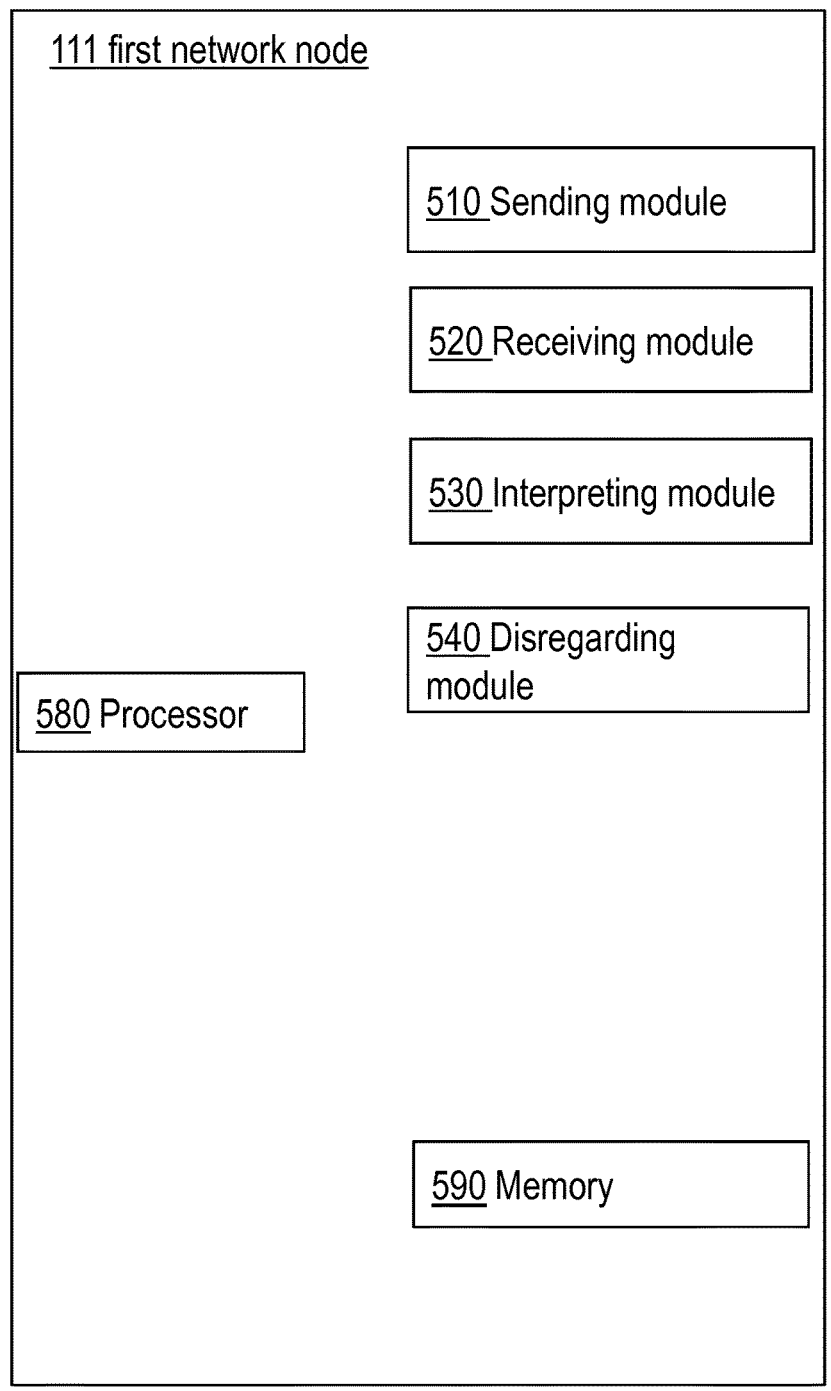
FIG. 5 is a schematic block diagram illustrating embodiments of a first network node.

To perform the method actions for handover preparation of the user equipment 140 of the first category in the wireless communications network 100 described above in relation to FIG. 3 and FIG. 4, the first network node 111, comprises the following arrangement depicted in FIG. 5.

As mentioned above, the wireless communications network 100 is configured to comprise the first network node 111 configured to serve the first cell 121. The wireless communications network 100 is further configured to comprise the second network node 112 configured to serve the second cell 122. The handover preparation is to be performed between the first cell 121 and the second cell 122.

The first category may comprise category 0. In some embodiments the user equipment 140 is of the MTC type.

In some embodiments the first category has limited capabilities compared to other categories, e.g. compared to the least capable legacy category.

The first network node 111 is configured to, e.g. by means of the sending module 510 configured to, send a message to the second network node 112. The message comprises information on handover preparation for the user equipment 140. The information indicates the request for preparation of the handover of the user equipment 140, which request is specific for user equipment of the first category.

In some embodiments the message comprises the Handover Preparation Information message specific for user equipment of the first category.

The Handover Preparation Information message specific for user equipment of the first category may comprise information on the capability of the user equipment 140 of the first category.

The sending module 510 may be implemented by a transmitter in the first network node 111.

The first network node 111 is further configured to, e.g. by means of the receiving module 520 configured to, receive the message indicating failure to prepare the handover.

The receiving module 520 may be implemented by a receiver in the first network node 111.

The first network node 111 is further configured to, e.g. by means of the interpreting module 530 configured to, interpret the message Indicating failure to prepare the handover as the indication that the second network node 112 does not support any user equipment of the first category.

The interpreting module 530 may be comprised in a processor 580 in the first network node 111.

The first network node 111 may further be configured to, e.g. by means of the disregarding module 540 configured to, disregard the second network node 112 as a potential candidate for handover of the user equipment 140 of the first category.

The disregarding module 540 may be comprised in the processor 580 in the first network node 111.

The first network node 111 may further be configured to, e.g. by means of a memory 590 configured to, store for example indications, messages, categories of user equipment and capabilities of user equipment, information, data, configurations, schedulings, and applications etc. The memory 590 comprises one or more memory units. The memory 590 is further configured to store information, data, configurations, schedulings, configurations and applications etc. to perform the methods herein when being executed in the first network node 111.

The embodiments herein to perform handover preparation of the user equipment 140 in the wireless communications network 100 may be implemented through one or more processors, such as the processor 580 in the first network node 111 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

Thus, the methods according to the embodiments described herein for the first network node 111 may be implemented by means of a computer program product, comprising instructions, i.e., software code portions, which, when executed on at least one processor, cause the at least one processor to carry out the actions described herein, as performed by first network node 111. The computer program product may be stored on a computer-readable storage medium. The computer-readable storage medium, having stored there on the computer program, may comprise the instructions which, when executed on at least one processor, cause the at least one processor to carry out the actions described herein, as performed by first network node 111. In some embodiments, the computer-readable storage medium may be a non-transitory computer-readable storage medium.

Those skilled in the art will also appreciate that the sending module 510, the receiving module 520, the interpreting module 530 and the disregarding module 540 described above may refer to a combination of analogue and digital circuits, and/or one or more processors configured with software and/or firmware, e.g. stored in a memory, that when executed by the one or more processors such as the processor 580 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 6:
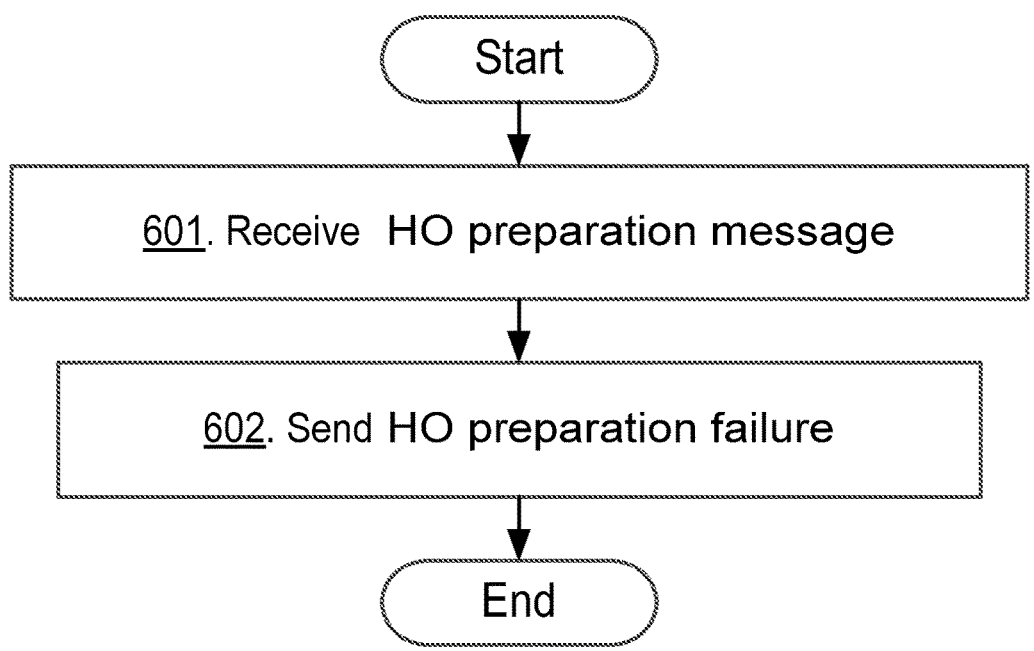
FIG. 6 is a flowchart illustrating embodiments of a method in a second network node.
Figure 7:
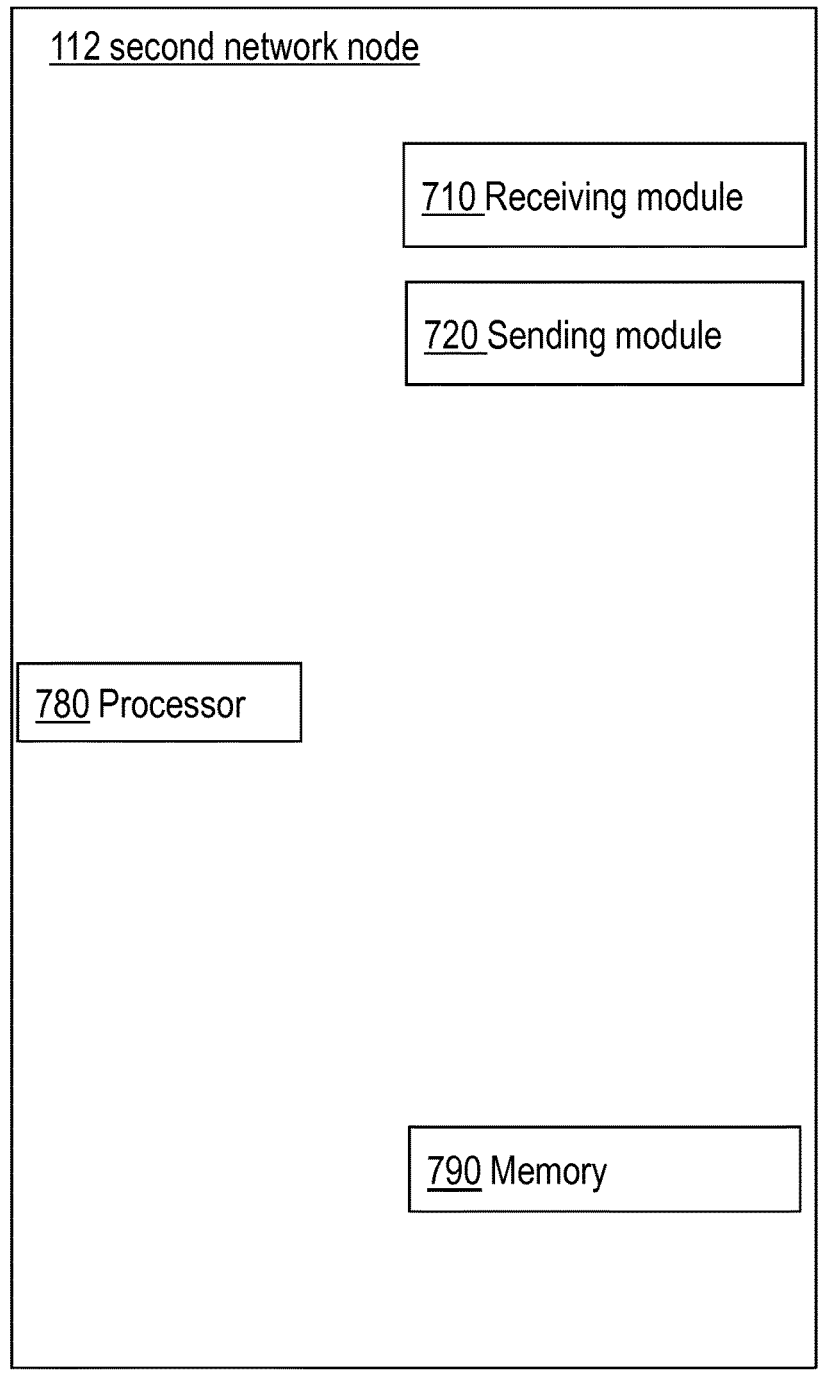
FIG. 7 is a schematic block diagram illustrating embodiments of a second network node.

Embodiments of a method in the second network node 112 for handover preparation of the user equipment 140 of the first category in the wireless communications network 100 will now be described with reference to a flowchart depicted in FIG. 6.

As mentioned above, the first network node 111 serves the first cell 121, also referred to as the source cell, the second network node 112 serves the second cell 122, also referred to as the candidate cell or target cell.

The user equipment 140 is to be handed over to a cell different from the first cell 121.

In some embodiments the first category has limited capabilities compared to the least capable legacy category, such as category 1. The first category may comprise category 0. In some embodiments the user equipment 140 is of the MTC type.

The method comprises the following actions, which actions may be taken in any suitable order.

Action 601

The second network node 112 receives from the first network node 111 a message comprising information on the handover preparation for the user equipment 140 of the first category. The information indicates the request for preparation of the handover of the user equipment 140. The request is specific for user equipment of the first category.

In some embodiments the message comprises the Handover Preparation Information message specific for user equipment of the first category.

The Handover Preparation Information message may comprises information on the capability of the user equipment 140 of the first category.

Action 602

The second network node 112 sends to the first network node 111 a message indicating failure to prepare the handover based on the received information indicating the request for preparation of the handover. The failure to prepare the handover indicates to the first network node 111 that the second network node 112 does not support any user equipment of the first category.

To perform the method actions for handover preparation of the user equipment 140 of the first category in the wireless communications network 100 described above in relation to FIG. 6, the first network node 111 is configured according to the description below.

As mentioned above, the wireless communications network 100 is configured to comprise the first network node 111 configured to serve the first cell 121. The wireless communications network 100 is further configured to comprise the second network node 112 configured to serve the second cell 122. The handover preparation is to be performed between the first cell 121 and the second cell 122.

In some embodiments the first category has limited capabilities compared to the least capable legacy category, such as category 1.

The first category may comprise category 0.

In some embodiments the user equipment 140 is of the MTC type.

The second network node 112 is configured to, e.g. by means of a receiving module 710 configured to, receive from the first network node 111 a message comprising information indicating the request for preparation of the handover of the user equipment 140. The request is specific for user equipment of the first category.

In some embodiments the message comprises the Handover Preparation Information message specific for user equipment of the first category.

The Handover Preparation Information message may comprise information on the capability of the user equipment 140 of the first category.

The receiving module 710 may be implemented by a receiver in the second network node 112.

The second network node 112 is further configured to, e.g. by means of a sending module 720 configured to, send to the first network node 111 a message indicating failure to prepare the handover. The second network node 112 is configured to send the message based on the received information indicating the request for preparation of the handover. The failure to prepare the handover indicates to the first network node 111 that the second network node 112 does not support any user equipment of the first category.

The sending module 720 may be implemented by a transmitter in the second network node 112.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first network node and a second network node should be considered to be non-limiting and does in particular not imply a certain hierarchical relation between the two.

The invention claimed is:

1. A method in a first network node for handover preparation of a user equipment of a first category in a wireless communications network, wherein the handover preparation is performed between a first cell served by the first network node and a second cell served by a second network node, which first network node, second network node, first cell and second cell are comprised in the wireless communications network, the method comprising:
- sending, to the second network node, a first message comprising information indicating a request for preparation of a handover of the user equipment from the first cell served by the first network node to the second cell served by the second network node, which request is specific for user equipment of the first category;
- receiving, from the second network node, a message indicating failure to prepare the handover; and
- interpreting the message indicating failure to prepare the handover as an indication that the second network node does not support any user equipment of the first category.

2. The method of claim 1, further comprising disregarding the second network node as a potential candidate for handover of any user equipment of the first category.

3. The method of claim 1, wherein the first message comprises a Handover Preparation Information message specific for user equipment of the first category.

4. The method of claim 3, wherein the Handover Preparation Information message specific for user equipment of the first category comprises information on the capability of the user equipment of the first category.

5. The method of claim 1, wherein the first category comprises category 0.

6. The method of claim 1, wherein the user equipment is of a Machine Type Communication (MTC) type.

7. A first network node for handover preparation of a user equipment of a first category in a wireless communications network, wherein the wireless communications network is configured to comprise the first network node configured to serve a first cell, and wherein the wireless communications network is further configured to comprise a second network node configured to serve a second cell, and wherein the handover preparation is to be performed between the first cell and the second cell, and wherein the first network node is configured to:
- send, to the second network node, a first message comprising information indicating a request for preparation of a handover of the user equipment from the first cell served by the first network node to the second cell served by the second network node, which request is specific for user equipment of the first category;
- receive, from the second network node, a message indicating failure to prepare the handover; and
- interpret the message indicating failure to prepare the handover as an indication that the second network node does not support any user equipment of the first category.

8. The first network node of claim 7, further configured to disregard the second network node as a potential candidate for handover of any user equipment of the first category.

9. The first network node of claim 7, wherein the first message comprises a Handover Preparation Information message specific for user equipment of the first category.

10. The first network node of claim 9, wherein the Handover Preparation Information message specific for user equipment of the first category comprises information on the capability of the user equipment of the first category.

11. The first network node of claim 7, wherein the first category comprises category 0.

12. The first network node of claim 7, wherein the user equipment is of a Machine Type Communication (MTC) type.

13. A method in a second network node for handover preparation of a user equipment of a first category in a wireless communications network, and the handover preparation is performed between a first cell served by a first network node and a second cell served by the second network node, which first network node, second network node, first cell and second cell are comprised in the wireless communications network, the method comprising:
- receiving, from the first network node, a first message comprising information indicating a request for preparation of a handover of the user equipment from the first cell served by the first network node to the second cell served by the second network node, which request is specific for user equipment of the first category; and
- sending, to the first network node, a message indicating failure to prepare the handover based on the received information indicating the request for preparation of the handover, which indication of failure to prepare the handover indicates to the first network node that the second network node does not support any user equipment of the first category.

14. The method of claim 13, wherein the first message comprises a Handover Preparation Information message specific for user equipment of the first category.

15. The method of claim 14, wherein the Handover Preparation Information message comprises information on the capability of the user equipment of the first category.

16. The method of claim 13, wherein the first category comprises category 0.

17. The method of claim 13, wherein the user equipment is of a Machine Type Communication (MTC) type.

18. A second network node for handover preparation of a user equipment of a first category in a wireless communications network, wherein the wireless communications network is configured to comprise a first network node configured to serve a first cell, and wherein the wireless communications network is further configured to comprise the second network node configured to serve a second cell, and wherein the handover preparation is to be performed between the first cell and the second cell, and wherein the second network node is configured to:
- receive, from the first network node, a first message comprising information indicating a request for preparation of a handover of the user equipment from the first cell served by the first network node to the second cell served by the second network node, which request is specific for user equipment of the first category; and
- send, to the first network node, a message indicating failure to prepare the handover based on the received information indicating the request for preparation of the handover, which indication of failure to prepare the handover indicates to the first network node that the second network node does not support any user equipment of the first category.

19. The second network node of claim 18, wherein the first message comprises a Handover Preparation Information message specific for user equipment of the first category.

20. The second network node of claim 19, wherein the Handover Preparation Information message comprises information on the capability of the user equipment of the first category.

21. The second network node of claim 18, wherein the first category comprises category 0.

22. The second network node of claim 18, wherein the user equipment is of a Machine Type Communication (MTC) type.

* * * * *